(12) United States Patent
Deac

(10) Patent No.: US 6,581,107 B1
(45) Date of Patent: Jun. 17, 2003

(54) METHOD OF ALLOCATING COMPUTER ADDRESSES TO UNITS OF A SYSTEM FOR RUNNING AN INDUSTRIAL INSTALLATION

(75) Inventor: Cornelius Deac, Sainte Genevieve Desbois (FR)

(73) Assignee: Alstom Enterprise SA, Perret (FR)

( * ) Notice: Subject to any disclaimer, the term of this patent is extended or adjusted under 35 U.S.C. 154(b) by 0 days.

(21) Appl. No.: 09/361,206

(22) Filed: Jul. 27, 1999

(30) Foreign Application Priority Data

Jul. 28, 1998 (FR) ............................................ 98 09657

(51) Int. Cl.[7] .............................................. G06F 15/16

(52) U.S. Cl. ...................................... 709/245; 709/223

(58) Field of Search ................................ 709/223, 224, 709/246, 245

(56) References Cited

U.S. PATENT DOCUMENTS

| | | | | |
|---|---|---|---|---|
| 5,550,984 A | * | 8/1996 | Gelb ........................... | 709/245 |
| 5,600,644 A | * | 2/1997 | Chang et al. ................. | 370/404 |
| 5,659,543 A | * | 8/1997 | Ater et al. .................... | 370/258 |
| 5,710,908 A | * | 1/1998 | Man ............................ | 709/230 |
| 5,724,510 A | * | 3/1998 | Arndt et al. .................. | 709/220 |
| 5,787,258 A | * | 7/1998 | Costa et al. .................. | 709/251 |
| 5,850,386 A | * | 12/1998 | Anderson et al. ........... | 370/241 |
| 5,909,368 A | * | 6/1999 | Nixon et al. ................. | 364/131 |
| 5,923,854 A | * | 7/1999 | Bell et al. .................... | 709/243 |
| 6,052,727 A | * | 4/2000 | Kamalanathan ............. | 709/224 |
| 6,061,356 A | * | 5/2000 | Terry ........................... | 370/401 |
| 6,061,739 A | * | 5/2000 | Reed et al. ................... | 709/245 |
| 6,070,187 A | * | 5/2000 | Subramaniam et al. ..... | 709/220 |
| 6,128,294 A | * | 10/2000 | Oura et al. ................... | 370/389 |
| 6,128,666 A | * | 10/2000 | Muller et al. ................ | 709/238 |
| 6,157,956 A | * | 12/2000 | Jensen et al. ................ | 709/246 |
| 6,167,448 A | * | 12/2000 | Hemphill et al. ............ | 709/224 |
| 6,189,102 B1 | * | 2/2001 | Beser ........................... | 713/201 |
| 6,198,479 B1 | * | 3/2001 | Humpleman et al. ....... | 345/329 |
| 6,266,336 B1 | * | 7/2001 | Siegel et al. ................. | 370/405 |

(List continued on next page.)

FOREIGN PATENT DOCUMENTS

WO      WO 98/31118      7/1998

OTHER PUBLICATIONS

Comer, "internetworking with TCP/IP", copyright 1995, Prentice Hall, Third Edition, vol. 1, pp. 1–2, 73–81, 83–87, 179–188, 289–301, 365–380.*

"Network IPL without a TFTPD Server". 2/94, IBM Technical Disclosure Bulletin, issue 2B, vol. 37, pp. 195–198.*

Morino et al., "Measurement of Packet Generation and Communication Chracteristics in Ehternet System", ICCS/ISITA (c) IEEE 1992, pp. 958–962.*

(List continued on next page.)

Primary Examiner—Bunjob Jaroenchonwanit
(74) Attorney, Agent, or Firm—Sughrue Mion, PLLC

(57) ABSTRACT

A method of allocating computer addresses between units of an industrial installation connected to a local communications architecture and using the IP, TCP, and UDP protocols. The method provides the following steps:

a unit broadcasts a request frame including a UDP port address specific to the unit, a UDP port address of an address allocation unit, and an address request;

the allocation unit takes the request into account on recognizing its own port address;

the allocation unit broadcasts a frame including its own IP address and the UDP port address of the requesting unit;

the IP address of the allocation unit is taken into account by the requesting unit on recognizing its own port address; and the requesting unit determines its IP address by substituting its own hardware address for the hardware address of the allocation unit in its IP address.

9 Claims, 1 Drawing Sheet

U.S. PATENT DOCUMENTS

| | | | |
|---|---|---|---|
| 6,300,863 B1 | * 10/2001 | Cotichini et al. | 340/5.8 |
| 6,343,320 B1 | * 1/2002 | Fairchild et al. | 709/224 |
| 6,381,650 B1 | * 4/2002 | Peacock | 709/245 |
| 6,418,124 B2 | * 7/2002 | Brabenac | 370/257 |
| 6,487,605 B1 | * 11/2002 | Leung | 709/245 |
| 6,493,767 B1 | * 12/2002 | Ishida et al. | 709/249 |
| 2001/0047430 A1 | * 11/2001 | Dev et al. | 709/245 |

OTHER PUBLICATIONS

Microsoft, "DHCP (Dynamic Host Configuration Protocol) Basics (Q169289)", http://support.microsoft.com, Oct. 1997, 8 pages.*

IBM, "Transmission Control Protocol/Internet Protocol Networking over Netbios", IBM Technical Disclosure Bulletin, vol. 6, iss. 12, Dec. 1993, pp. 619–624 (6).*

Pimplaskar et al., "Protocol Filtering: A Microscopic Approach to Windows NT & Novell Netware Network Modeling", IEEE, 199 pp. 462–466.*

Stevens, W.R.: "TCP/IP Illustrated, vil. 1, The Protocols." 1994, Addion Wesley, US, Reading, MA XP002100788 p. 215–217.

Database WPI Section EI, Week 9820 Derwent Publications Ltd., London GB;Class W01, AN 98–223612 XP0002100789 & JP 10 065722 A (NEC Corp), Mar. 6, 1999.

* cited by examiner

METHOD OF ALLOCATING COMPUTER ADDRESSES TO UNITS OF A SYSTEM FOR RUNNING AN INDUSTRIAL INSTALLATION

The invention relates to a method of allocating computer addresses to units of a system for running an industrial installation, the units being interconnected via a local architecture for communicating time-shared digital information.

BACKGROUND OF THE INVENTION

In known manner, the management of a system for running an industrial installation implies the presence of a communications architecture so that information can be transmitted between the various programmable operating units which are involved in the running of the installation in a manner that is well adapted to the various needs encountered.

In such systems, it is conventional to use time-shared operation of the transmission links between the programmable operating units, and to allow information that is subject to transmission constraints that are relatively flexible in terms of urgency to take advantage of the pauses that are left available on a more or less regular basis by other information that is subject to constraints that are more severe.

In the context of developments associated with computing, and in particular with communications networks of the Internet or the Intranet type, various techniques have been developed. These techniques make it easier to make use of stored information by making it available to a large number of parties, practically regardless of the location of the parties relative to the sites where the information is stored, and this is done in forms that are universally standardized.

The invention thus proposes to transpose some of those techniques so as to provide a simple and practical solution to a problem that exists in systems for running industrial installations where programmable operating units that are conventionally organized around respective suitably-programmed computers having associated memory, are interconnected by a local communications architecture.

As is known in this field, each unit has a hardware unit address which is physically defined and which is conventionally said to be "hard-wired", which address serves to identify a particular unit amongst the others in the system and is conventionally imposed by the installer or by the operator when the system is put into service.

It is also necessary for the units which are to be able to communicate with one another by computer type information transmission techniques to have individual computer addresses enabling them to identify themselves when they send information and enabling them to be reached when information is sent to them.

Thus, when information is interchanged by using the Internet protocol IP, it is necessary for each unit to have an individual IP address. These addresses can be allocated in a local network in manual manner, however that solution is not entirely satisfactory, particularly when the number of interconnected units is high. This is often the case with local networks provided in industry, and furthermore it is sometimes necessary to modify such networks over time.

Addresses can also be allocated to units in a local network by means of an IP address server, such as BOOT P, which is provided in the Internet. However, that solution is not very suitable when the communications architecture involved does not enable a sufficient number of bytes to be transferred without segmentation, as happens in certain communications architectures for industrial systems.

OBJECTS AND SUMMARY OF THE INVENTION

The invention thus proposes a method of allocating computer addresses to units of a system for running an industrial installation, the units being interconnected by a local time-shared communications architecture in which information is transmitted in digital form, the method being applicable to units which are originally provided with a hardware address in digital form and which are suitable for communicating between one another by using the IP, TCP, and UDP protocols after each of them has obtained an IP computer address including a header made up of data relating to the network address of the local communications architecture followed by address data individual to the sending unit.

According to a characteristic of the invention, the allocation method provides for the following in succession:

- an address request frame is broadcast over the local communications architecture by a requesting unit seeking to obtain its own computer address, said frame including in particular a destination UDP port address relating to one of the units acting as an address allocator in the local architecture, a source UDP port address specific to the requesting unit, and data characteristic of an address request;
- the request is taken into account by an application in the allocation unit on said unit recognizing the UDP port address that belongs thereto;
- an allocation frame having the same structure as the request frame is broadcast over the local communications architecture by the address allocation unit, said allocation frame including, in particular, the UDP port address of the requesting unit, at a destination level, and data corresponding to its own allocation unit IP address;
- the data corresponding to the IP address of the allocation unit is taken into account by the requesting unit on recognizing its own UDP port address in the destination level of the broadcast allocation frame, and the requesting unit determines its own IP address for storage and operating purposes from the IP address data of the allocation unit that it has received, by substituting hardware address data specific to itself for the hardware address data of the allocation unit at the end of the IP address as communicated for said allocation unit.

The invention provides for the allocation and request frames to include in identical manner a header comprising in succession a physical address and a destination IP address which are characteristic of a broadcast, a source IP address relating to a source considered as being unknown in the context of a request frame and relating to the address allocation unit in the context of an allocation frame, a destination UDP port address relating to the allocation unit in the context of a request frame and to the address requesting unit in the context of an allocation frame, a source UDP port address relating to the requesting unit in the context of a request frame and relating to the address allocation unit in the context of an allocation frame, and a data byte characteristic of an address request in the context of a request frame and corresponding to the hardware address of the allocation unit in the context of an allocation frame.

BRIEF DESCRIPTION OF THE DRAWINGS

The invention, its characteristics, and its advantages are described in greater detail in the following description given with reference to the figures mentioned below.

MORE DETAILED DESCRIPTION

Figure 1:
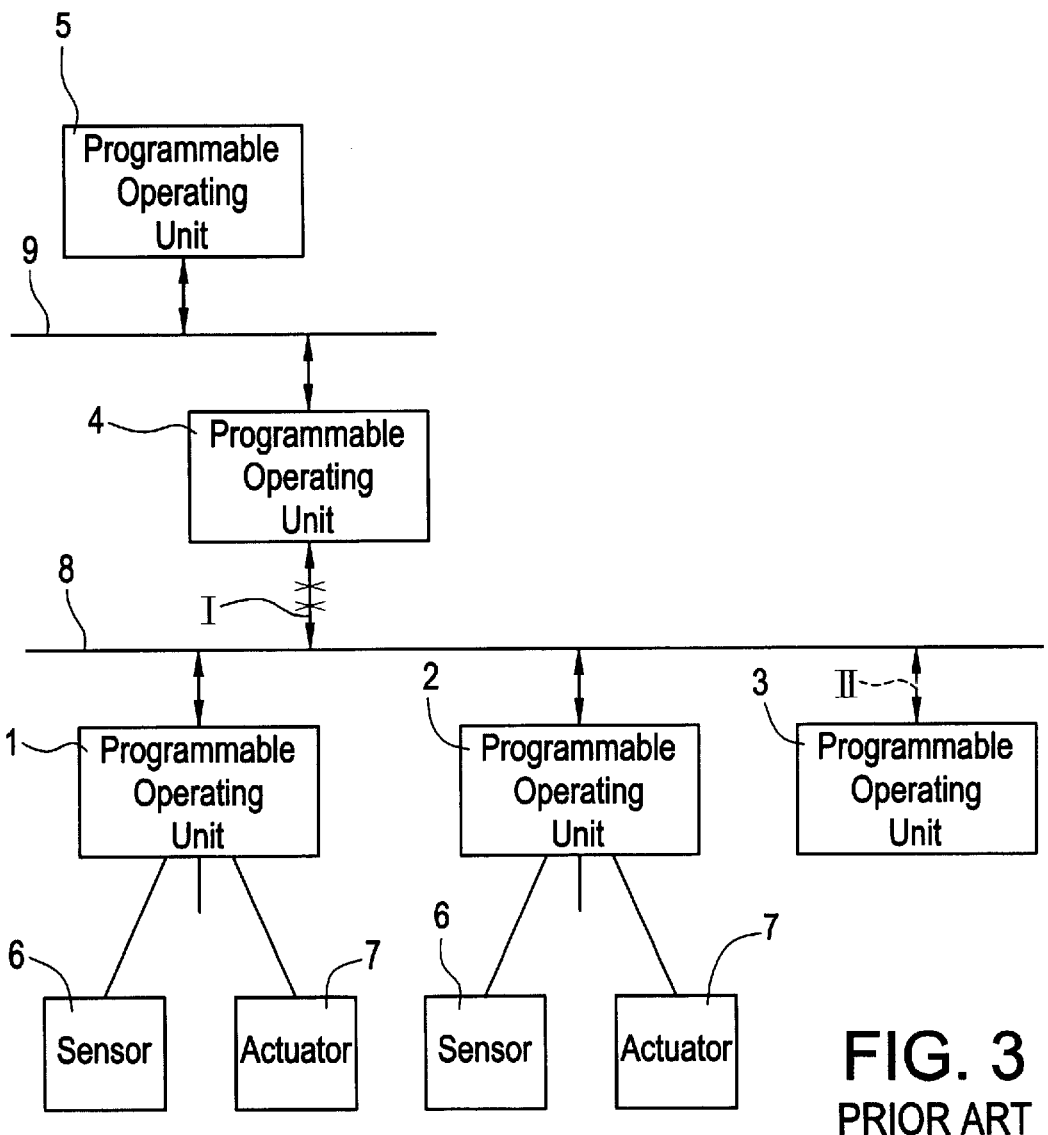
FIG. 1 is a block diagram of a communications architecture for a system for running an industrial installation.

The communications architecture for a system for running an industrial installation, as shown in FIG. 1, is assumed to be intended to allow digital information to be interchanged between programmable operating units referenced 1 to 5 of the system which has a plurality of monitoring and/or control devices. By way of example, these devices can be sensors 6 or actuators 7, and they are controlled by various ones of the operating units commonly referred to as "on-site" units or devices, such as 1 and 2 in this case.

These on-site devices 2 are assumed to supply and/or receive information relating to operations, in particular control and measurement operations performed by the devices that they supervise. They interchange information that is put into digital form as a function of requirements, in particular with other units of the system for running the installation, such as the unit 3 in a first variant embodiment where only link II is established, such as units 4 and 5 in a second variant where only link I is established, and such as the units 3, 4, and 5 in a third variant where both the links I and II are established.

Each of the various operating units 1 to 5 is organized around at least one processor and a set of read-only and/or read/write memories, and each unit is connected via a communications interface to the communications architecture of the system, or more precisely to at least one of the links of said architecture.

In the example shown, the on-site units 1 and 2 and the operating unit 3, e.g. a local operator station, form part of a local network organized around a bus 8 that is operated in time sharing. Information is transmitted in digital form, for example as packets during time frames that are structured in a determined manner, as is known in this field. One of the operating units 4 is assumed to act as a router between the other units connected to the bus 8 and units of a higher level. In this case the higher-level units are assumed to be connected, by way of example, to an Ethernet network 9 and they are symbolized by the unit 5. By way of example, this unit can be a process controller or an operator console.

In the invention, provision is made to apply communications techniques and in particular addressing techniques that have been developed in the context of the Internet to at least some of the information that is interchanged between the operating units in a local network of the kind mentioned above. As is known, this implies that each unit connected to the network has an individual computer address which it uses to identify itself when it sends information and which is used by the other units when they seek to communicate therewith. Conventionally, this computer address takes account of a hardware address of a unit, which hardware address is defined physically and is conventionally said to be "hard-wired", thereby enabling one particular unit to be identified amongst the others, which address is given when the installation is put into service. By way of example, this hardware address can be set by means of a system of jumpers; switches; or code wheels that are physically installed in each unit.

Figure 2:
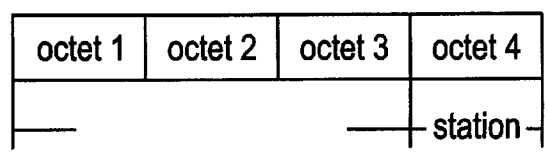
FIG. 2 shows an IP address format as used by the invention.

In the presently-proposed example, the computer address of each of the addressable units of a local network is given by applying the rules that are in force in version 4 of the Internet protocol (IP). Each unit computer address is present in the form shown diagrammatically in FIG. 2, where there are shown, by way of example, three network address bytes followed by a unit address byte. In this case, the unit address byte corresponds to the individual hardware address initially given to each unit when the installation was put into service. The number of addresses made available by this last byte is generally sufficient to identify all of the units, in particular all of the on-site units, in a local network or a segment of a local network in a system for running an industrial installation.

Figure 3:
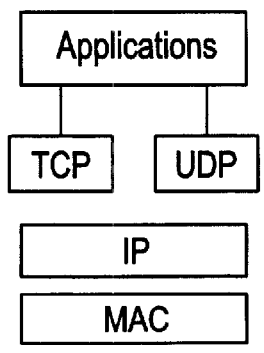
FIG. 3 is a diagram relating to a four-layer stack protocol implemented by the invention.

However, although each unit of a local network has a hardware address when it is put into service, it does not necessarily have an IP computer address allocated thereto. According to the invention, provision is thus made for each unit to request an IP address by broadcasting over the local network if it does not already know its IP address. Provision is thus made for a stack comprising IP, TCP, and UDP layers, as shown diagrammatically in FIG. 3, between the application and the network access layer MAC, and to do so within each of the units connected to the local network.

An address request is broadcast from a unit by sending out a datagram using the user datagram protocol (UDP), and thus in a mode which is said to be "not connected". In this case, the request is assumed to be carried in a transmission frame that is in force in the local network, and that has the following structure:

<physical header><IP header><UDP header><data>

This frame thus comprises a physical header having a given number of bytes, e.g. six bytes in the Applicants' F8000 network or twelve bytes in an Ethernet network. The header is followed by a 20-byte IP header which is itself followed by an 8-byte UDP header, after which there follow data bytes.

In conventional manner, an IP header has four source address bytes and four destination address bytes. Similarly, a UDP header has two source port address bytes and two destination port address bytes.

The address coming from an operating unit such as on-site unit 1, for example, is broadcast in the form of a request frame whose structure is defined as follows:

<broadcast physical address><destination IP address>
  <source IP address><destination port address>
    <source port address><data>

In this frame, the physical header address is characteristic of a broadcast, as is the IP destination address, which address corresponds, for example, to the code 255.255.255.255 in decimal notation. The source address corresponds to a code that is characteristic of an unknown source, e.g. 0.0.0.0. The source port address supplied is that of the UDP port selected for the unit that is requesting an address, e.g. 6003 for unit 3. The destination port address is a UDP port address, e.g. 6255, that is predetermined and originally allocated to the operating unit in charge of allocating addresses at local level. In the first above-envisaged variant, said unit is unit 3, and in the second variant it is unit 4. The control data appearing at the tail end of the above frame is assumed in this case to be characteristic of a request for an address.

The request frame is broadcast by the local network and thus over the bus 8. It passes through the physical layer, the IP layer, and it reaches the UDP layer where the UDP port address is recognized as being allocated to the address allocation unit.

An application installed in this allocation unit enables the request carried by the above-defined request frame to be processed and enables an IP address that is available at local level to be allocated to the requesting unit. On receiving the request frame, the address allocation unit 3 or 4 in turn broadcasts an allocation frame whose structure is identical to that defined above. This frame contains in succession a physical address and a destination IP address characteristic of a broadcast, as before, a source IP address and a source port UDP address specific to the address allocation unit, a UDP address relating to the destination port provided for the requesting unit that broadcasts the request frame, and data defining the IP address that is possessed by the allocation unit.

By way of example, this data defines an address such as 192.9.240.17 in which the last byte, which in this case corresponds to decimal number 17, also corresponds to the hardware address of the allocation unit.

The IP layer presents to the UDP layer only the data, which data corresponds in this case to the IP address of the allocation unit. The allocation frame is broadcast by the allocation unit to all of the units belonging to the local network, and in particular to the on-site units, such as the units 1 and 2, over the bus 8 in the example shown in FIG. 1.

The destination port address contained in an allocation frame enables the unit operating said port to know that the data contained in said frame is addressed to the unit and corresponds to the data that will enable it to determine its own IP address. The received IP address corresponds to the address of the address allocation unit and it differs from that of the requesting unit only in the last byte which, as mentioned above, is established so as to correspond to a unit hardware address.

In the example described where the requesting unit has a hardware address corresponding to the number 3 in decimal notation and where the IP address that it receives in the allocation frame is 192.9.240.17 in decimal notation, means are provided in the control unit of said requesting unit that enable the value of the last byte of the IP address to be modified so that it corresponds to the decimal number 3 of the hardware address of the requesting unit, and this number is substituted for the byte corresponding to the number 17 of the allocation unit. In the example described, the requesting unit of hardware address 3 thus determines that it has IP address 192.9.240.3 in the context of the local network to which it is connected. It is thus ready to take any appropriate measure to conserve or use said IP address.

It is thus particularly simple to determine IP addresses in a set of units connected to a common local network, and this can therefore be done quickly while requiring only a very small amount of data traffic.

This IP addressing for the units of a local network can be used in particular for data transmission in the form of HTML pages. In some cases, at least some of the units and in particular the on-site units have respective servers enabling them to fill in predetermined HTML page structures stored in said units with the values of variables or parameters that are collected and/or used locally, so as to make them available to a wide variety of intervening parties.

Such access can be performed via units connected to the local network which act as clients to the servers or via computers with hardware or software enabling them to connect themselves to the local network either directly or else via another communications network, and in particular the Internet.

What is claimed is:

1. A method of allocating computer addresses to units of a system for running an industrial installation, the units being interconnected by a local communications architecture, the method being applicable to units which are originally provided with a hardware address in digital form, the method comprising:

broadcasting an address request fame over the local communications architecture by a requesting unit seeking to obtain its own computer address, said address request frame including a destination UDP pots address relating to one of the units acting as an address allocator in the local architecture, a source UDP port address specific to the requesting unit, mid data characteristic of an address request;

receiving the request in an application in the allocation unit, said application recognizing the UDP port address that belongs to said allocation unit;

said allocation unit broadcasting an allocation frame having the same structure as the request frame over the local communications architecture, said allocation frame including the UDP port address of the requesting unit, at a destination level, and data corresponding to an allocation unit IP address;

receiving the data corresponding to the IP address of the allocation unit in the requesting unit on the requesting unit recognizing its own UDP port address in the destination level of the broadcast allocation frame, wherein the requesting unit assigns its own IP address for storage and operating purposes by taking into account the IP address data received from the allocation unit on recognizing its own port address, by substituting hardware address data specific to the requesting unit for the hardware address data of the allocation unit in the IP address as communicated for said allocation unit.

2. A method according to claim 1, wherein the allocation and request frames include a substantially identical header comprising:

a physical address and a destination IP address characteristic of a broadcast;

a source IP address relating to a source considered unknown in the context of a request frame and relating to the allocation unit in the context of an allocation frame;

a destination UDP port address relating to the allocation unit in the context of a request frame and to the address requesting unit in the context of an allocation frame;

a source UDP port address relating to the requesting unit in the context of a request frame and relating to the allocation unit in the context of an allocation frame; and a data byte characteristic of an address request in the context of a request frame and corresponding to the hardware address of the allocation unit in the context of an allocation frame.

3. The method of claim 1, wherein said units are suitable for communicating between one another by using the IP, TCP, and UDP protocols after each of said units has obtained an IP computer address including a header made up of data relating to the network address of the local communications architecture followed by address data individual to the sending unit.

4. A system of allocating computer addresses to units that are interconnected and originally provided with a hardware address in digital form, for running an industrial installation, comprising:

a requesting unit, positioned in a local network, that broadcasts a request to obtain its computer address, said request including a destination UDP port address relating to one of the units acting as an address allocator in the local network, a source UDP port address specific to the requesting unit, and data characteristic of an address request; and an allocation unit that receives said request in an application that recognizes the UDP port address that belongs to said allocation unit, and broadcasts a response to said local network, said response including an IP address of said allocation unit and the UDP port address of the requesting unit at a destination level, wherein said application substitutes a hardware address of said IP address with hardware address data of said requesting unit to generate said computer address, wherein the requesting unit receives said IP address when said requesting unit recognizes its own UDP port address in said destination level, and assigns its own IP address for storage and operating purposes, taking into account the IP address received from the allocation unit on recognizing its own port address, by substituting hardware address data specific to the requesting unit for the hardware address of the allocation unit in the IP address as communicated for said allocation unit.

5. The system of claim 4, wherein said request comprises:

a destination UDP port address relating to one of a plurality of units in said local network that acts as an address allocator;

a source UDP port address specific to said requesting unit; and data characteristic of said request.

6. The system of claim 5, wherein said response comprises:

said UDP port of said requesting unit; and data corresponding to said IP address of said allocation unit.

7. The system of claim 4, further comprising at least one of a sensor and an actuator coupled to said requesting unit.

8. The system of claim 4, further comprising a router coupled between said requesting unit and said allocation unit, wherein said router communicates with said requesting unit via a bus and with said allocation unit with Ethernet connection.

9. The system of claim 4, further comprising a local operator station coupled to said requesting unit via a bus.

* * * * *